(12) United States Patent  
Kimura (10) Patent No.: US 8,406,612 B2  
(45) Date of Patent: Mar. 26, 2013

(54) BROADCAST RECORDING APPARATUS AND BROADCAST RECORDING METHOD

(75) Inventor: Takahiro Kimura, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1561 days.

(21) Appl. No.: 11/707,007

(22) Filed: Feb. 16, 2007

(65) Prior Publication Data

US 2007/0212018 A1 Sep. 13, 2007

(30) Foreign Application Priority Data

Feb. 20, 2006 (JP) ................................. 2006-042998

(51) Int. Cl.
*H04N 5/76* (2006.01)
(52) U.S. Cl. ........................................ 386/293; 386/295
(58) Field of Classification Search .......... 386/1, 45–46, 386/83, 125–126, 291–298
See application file for complete search history.

(56) References Cited

U.S. PATENT DOCUMENTS

| 2002/0174430 | A1* | 11/2002 | Ellis et al. ......................... 725/46 |
| 2003/0108328 | A1* | 6/2003 | Kawasaki et al. ............... 386/46 |

FOREIGN PATENT DOCUMENTS

| JP | 7-326089 | 12/1995 |
| JP | 10-293358 | 11/1998 |
| JP | 11-112839 | 4/1999 |
| JP | 3077511 | 2/2001 |
| JP | 2002-344861 | 11/2002 |
| JP | 2003-289490 | 10/2003 |
| JP | 2004-86288 | 3/2004 |
| JP | 2005-57692 | 3/2005 |
| JP | 2005-109529 | 4/2005 |

OTHER PUBLICATIONS

Notice of Reasons for Rejection mailed by the Japanese Patent Office on Jun. 8, 2010, for counterpart Japanese Patent Application No. 2006-042998, and English translation thereof (5 pages).
Office Action by the Japanese Patent Office mailed May 15, 2012, for counterpart Japanese Patent Application No. 2006-042998, and English translation thereof (5 pages).

* cited by examiner

*Primary Examiner* — Thai Tran
*Assistant Examiner* — Nigar Chowdhury
(74) *Attorney, Agent, or Firm* — Finnegan, Henderson, Farabow, Garrett & Dunner, L.L.P.

(57) ABSTRACT

According to one embodiment, there is provided broadcast recording apparatus having tuner unit which receives broadcast signal, demodulates the received signal, and outputs video image/audio signal, reservation setting unit which makes image recording reservation for specific program, and then, provides lock setting for preventing automatic deletion after image recording at the time of the image recording reservation, reserved image recording unit which, when time indicated by reservation information has come, records video image/audio signal of the broadcast signal in storage region together with the lock setting, and lock control unit which, if it is judged that free space of the storage region is insufficient when the reserved image recording unit performs reserved image recording in accordance with reservation information, deletes signal to which the lock setting is not provided, from among the video image/audio signals stored in the storage region.

7 Claims, 6 Drawing Sheets

BROADCAST RECORDING APPARATUS AND BROADCAST RECORDING METHOD

CROSS-REFERENCE TO RELATED APPLICATIONS

This application is based upon and claims the benefit of priority from Japanese Patent Application No. 2006-042998, filed Feb. 20, 2006, the entire contents of which are incorporated herein by reference.

BACKGROUND

1. Field

One embodiment of the invention relates to a broadcast recording apparatus for recording a broadcast program, and particularly to a broadcast recording apparatus and a broadcast recording method for providing lock setting for avoiding automatic deletion of a program at a stage of image recording reservation.

2. Description of the Related Art

Recently, with prevalence of a digital device, a broadcast receiving apparatus such as a hard disk recorder has been generally used. It becomes possible to easily record/reproduce more video image information than a case of a recording/reproducing process using a conventional video tape recorder (VTR). In such a broadcast receiving apparatus, it becomes possible to further easily carry out an unattended image recording process by utilizing electronic program guide supplied from a broadcast station or a server.

However, in the conventional techniques (Jpn. Pat. Appins. KOKAI Publication No. 2003-289490, and KOKAI Publication No. 2004-86288), there is a problem that program lock setting cannot be provided at a stage of program recording reservation.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a broadcast recording apparatus, comprising: a tuner unit which receives a broadcast signal, demodulates the received signal, and outputs a video image/audio signal; a reservation setting unit which makes image recording reservation for a specific program, and then, provides lock setting for preventing automatic deletion after image recording at the time of the image recording reservation; a reserved image recording unit which, when a time indicated by reservation information has come, records a video image/audio signal of the broadcast signal in a storage region together with the lock setting; and a lock control unit which, if it is judged that a free space of the storage region is insufficient when the reserved image recording unit performs reserved image recording in accordance with reservation information, deletes a signal to which the lock setting is not provided, from among the video image/audio signals stored in the storage region.

Now, embodiments of the present invention will be described in detail with reference to the accompanying drawings.

Figure 1:
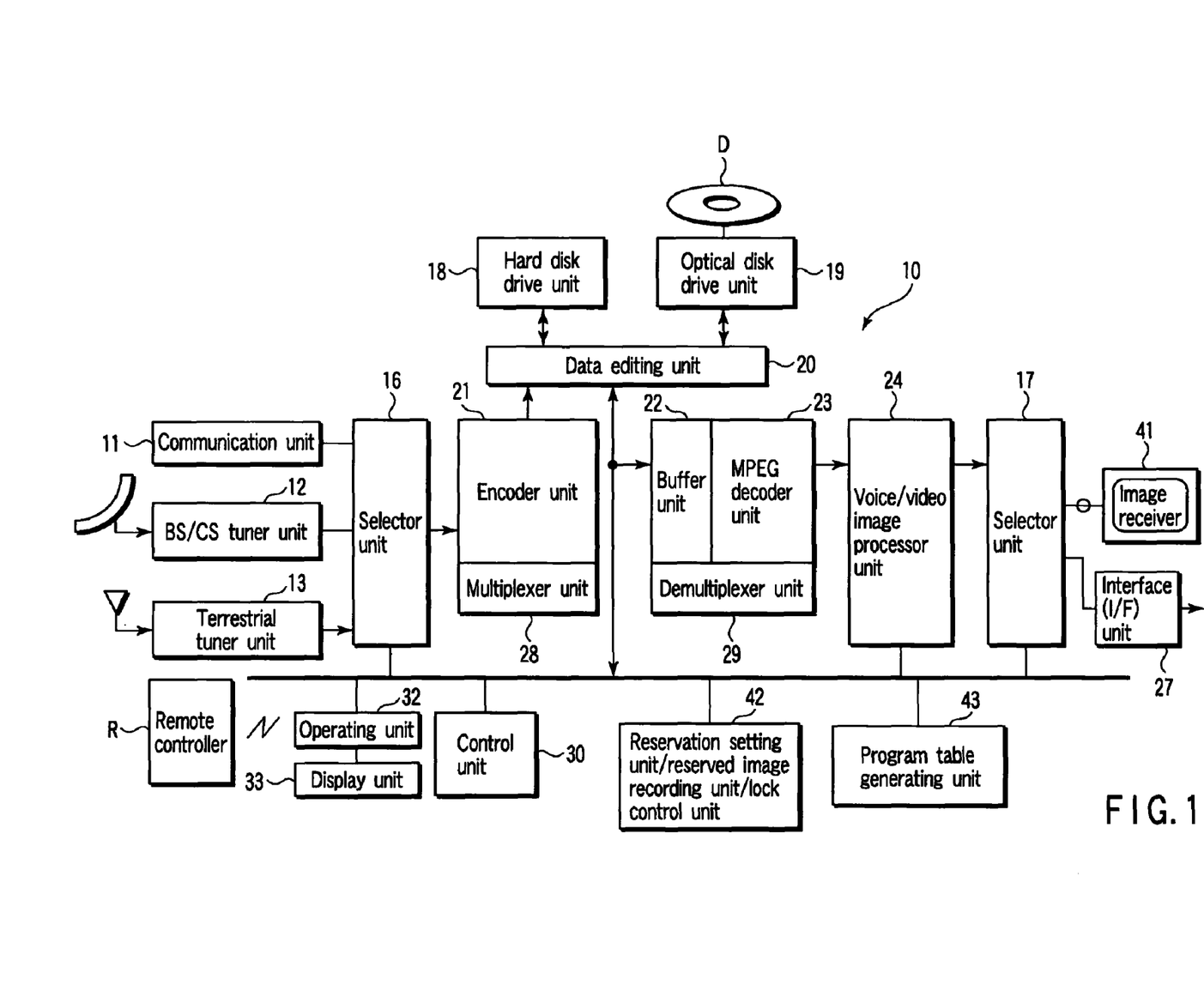
FIG. 1 is a block diagram depicting an example of a configuration of a broadcast recording apparatus according to an embodiment of the present invention.
Figure 2:
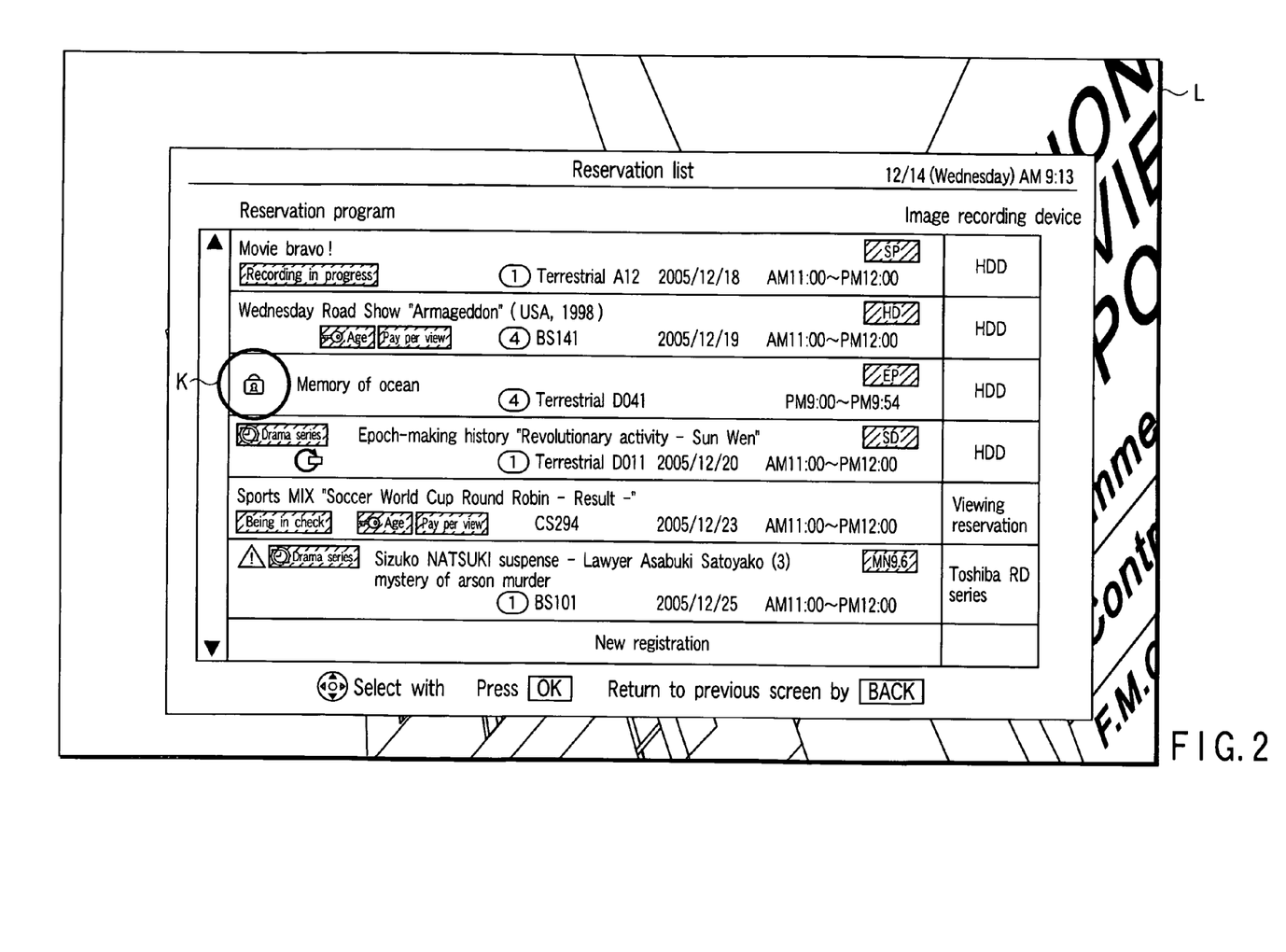
FIG. 2 is an illustrative view showing an example of an image recording list that the broadcast recording apparatus displays.
Figure 3:
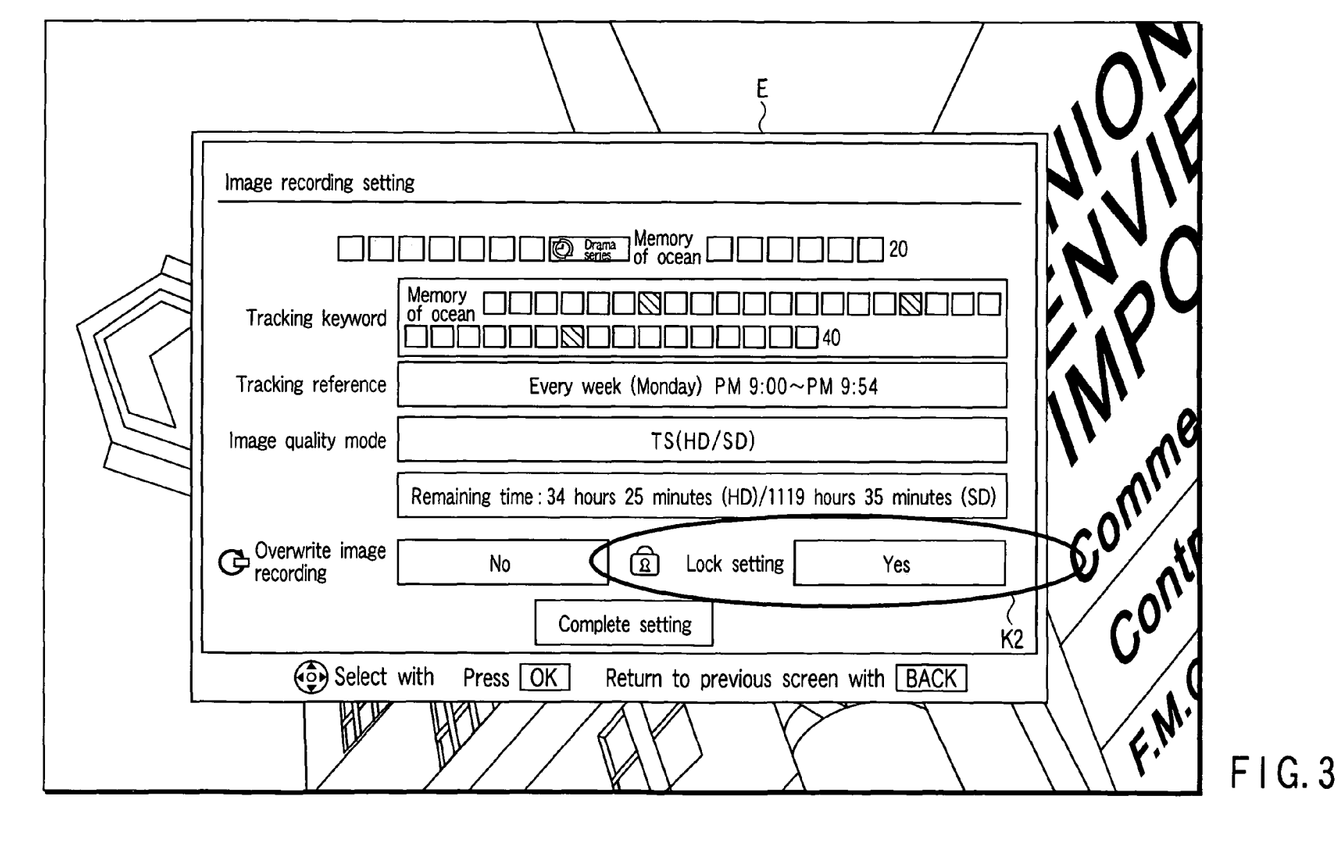
FIG. 3 is an illustrative view showing an example of a reserved image recording setting screen that the broadcast recording apparatus displays.
Figure 4:
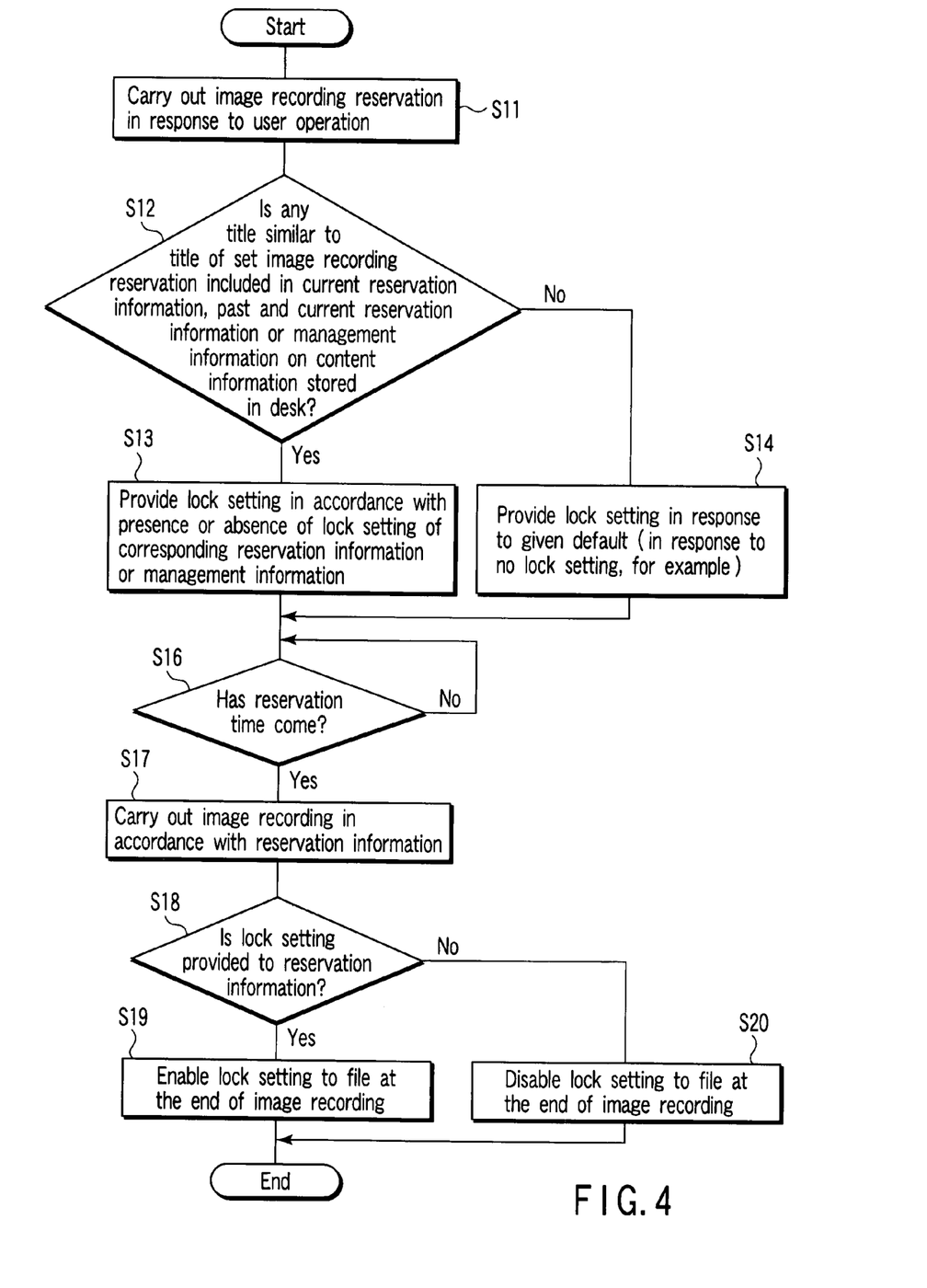
FIG. 4 is a flow chart showing an example of a lock setting process at the time of reserved image recording using the broadcast recording apparatus.
Figure 5:
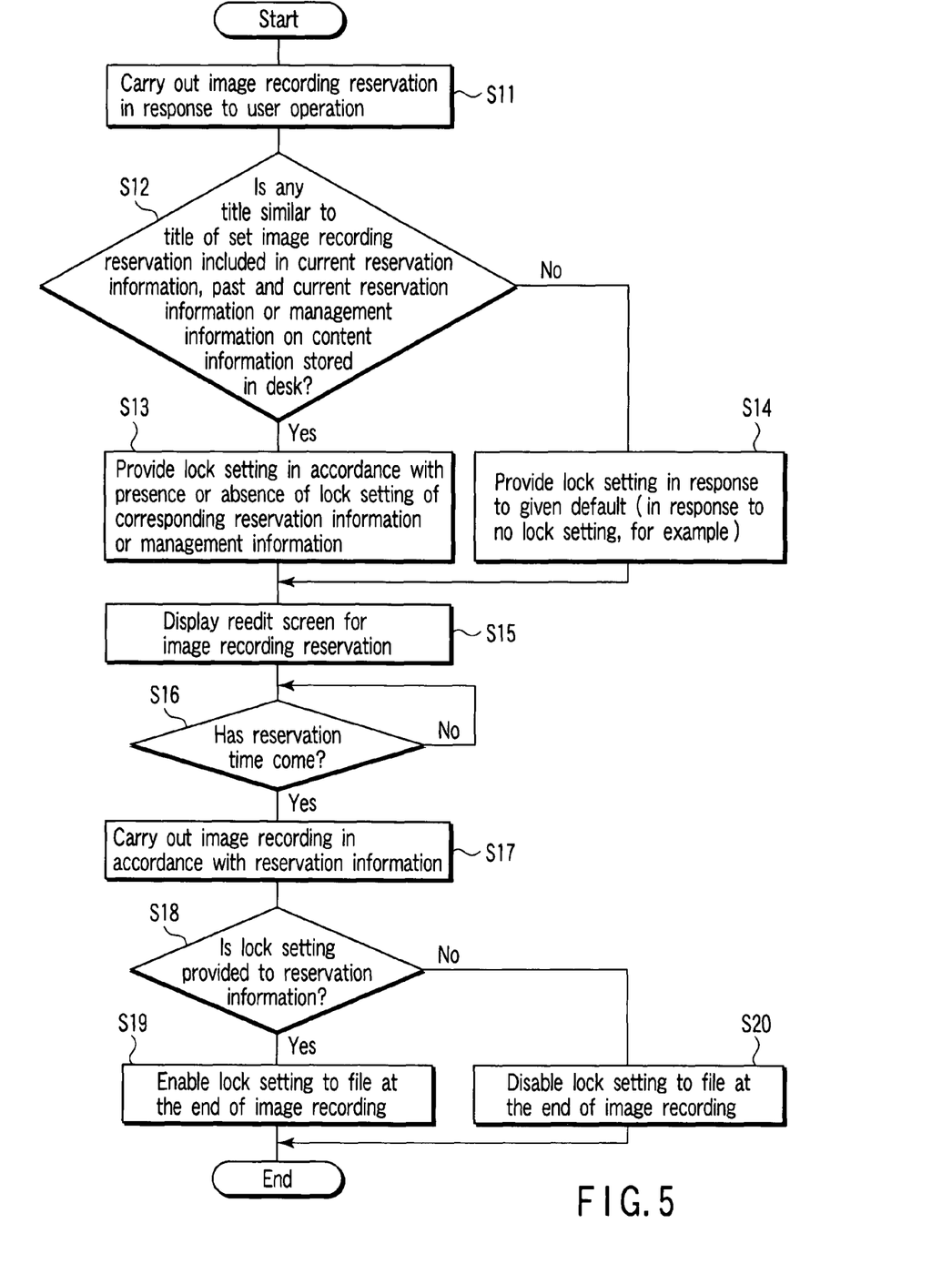
FIG. 5 is a flow chart showing another example of a lock setting process at the time of reserved image recording using the broadcast recording apparatus.

FIG. 1 is a block diagram depicting an example of a configuration of a broadcast recording apparatus according to an embodiment of the present invention; FIG. 2 is an illustrative view showing an example of an image recording list that the broadcast recording apparatus displays; FIG. 3 is an illustrative view showing an example of a reserved image recording setting screen that the broadcast recording apparatus displays; FIG. 4 is a flow chart showing an example of a lock setting process at the time of reserved image recording using the broadcast recording apparatus; and FIG. 5 is a flow chart showing an operation of a file deleting process using the broadcast recording apparatus.

Broadcast Recording Apparatus According to an Embodiment of the Present Invention (Configuration)

First, in a broadcast receiving apparatus 10 of FIG. 1, as an example, there is shown a digital television having a recording function while a tuner or the like is used as a source. In addition, it is preferable that the broadcast receiving apparatus 10 should be a hard disk recorder having a tuner or the like and a recording function.

Therefore, in the following description of the embodiments section with reference to FIG. 1, while a description will be given in detail with respect to a digital television having a recording function, this detailed description can be construed as a description of a hard disk recorder having exactly the same function by separating a display 25 from the configuration shown in FIG. 1.

In FIG. 1, the broadcast receiving apparatus 10 that is a digital television has two types of disk drives. In other words, this apparatus has a hard disk drive unit 18 that drives a hard disk H as a first medium and an optical disk drive unit 19 that rotationally drives an optical disk D serving as an information recording medium capable of constructing a video file as a second medium and that executes information reading and writing. In addition, a control unit 30 is connected to each unit via a data bus B in order to control a whole operation. However, in the case of carrying out the present invention, the optical disk drive unit 19 is not always a necessary constituent element.

In addition, the broadcast receiving apparatus 10 of FIG. 1 primarily comprises: an encoder unit 21 that configures an image recording side; an MPEG decoder unit 23 that configures a reproducing side; and a control unit 30 that controls an operation of a main body of the apparatus. The broadcast receiving apparatus 10 has an input side selector 16 and an output side selector 17. A communication unit 11 such as LAN, a so-called satellite broadcast (BS/CS) digital tuner unit 12, and a so-called terrestrial digital/analog tuner unit 13 are connected to the input side selector 16, and a signal is outputted to the encoder unit 21. In addition, a satellite antenna is connected to the BS/CS digital tuner unit 12, and a terrestrial antenna is connected to the terrestrial digital/analog tuner unit 13. In addition, the broadcast receiving apparatus 10 has: an encoder unit 21; a signal editing unit 20 that receives an output from the encoder unit 21 and carries out desired data processing such as data editing; a hard disk drive unit 18 connected to the signal editing unit 20; and an optical disk drive unit 19. Further, the broadcast receiving apparatus 10 has: an MPEG decoder unit 23 that receives and decodes signals from the hard disk drive unit 18 and the optical disk drive unit 19; an encoder unit 21; a buffer unit 22; an MPEG decoder unit 23; a multiplexer unit 28; a demultiplexer unit 29; a control unit 30; a reservation setting unit/reserved image recording unit/lock control unit 42; and a program table generating unit 43. These units each are connected to the control unit 30 via the data bus B. Further, an output of the selector unit 17 is supplied to the display 26 or is supplied to an external device via an interface unit 27 that makes communication with the external device.

Further, the broadcast receiving apparatus 10 has an operating unit 32 connected to the control unit 30 via the data bus B, the operating unit receiving an operation of a user or an operation of a remote controller R. Here, the remote controller R enables an operation that is substantially identical to that of the operating unit 32 provided at the main body of the broadcast receiving apparatus 10. This remote controller enables a variety of settings such as settings of a recording/reproducing instruction of the hard disk drive unit 18 or the optical disk drive unit 19, an edit instruction, and tuner operation and reserved image recording.

(Basic Operation)

Reproducing Broadcast Contents

In the thus configured broadcast receiving apparatus 10 that is a digital television, a broadcast signal is received under the control of the control unit 30 or the like and broadcast contents from the BS/CS tuner 12 or the terrestrial digital/analog tuner unit 13 are displayed on the display 26 in accordance with an operating signal responsive to an operation of the user's remote controller R or the operating unit 32.

Recording Process

Now, an operation at the time of recording will be described in detail including those of other embodiments. As an input side of the broadcast receiving apparatus 10, the communication unit 11 such as LAN is connected to an external device to make communication with a program information providing server or the like through a communication channel such as the Internet via a modem or the like, for example, or to download broadcast contents or the like. In addition, the BS/CS digital tuner unit 12 and the terrestrial digital/analog tuner unit 13 each channel-select and demodulate a broadcast signal via an antenna, input a video image signal and an audio signal, and are compatible with a variety of broadcast signals. Examples of such broadcast signals include: a terrestrial analog broadcast signal; a terrestrial digital broadcast signal; a BS analog broadcast signal; a BS digital broadcast signal; a CS digital broadcast signal or the like without being limited thereto. In addition, the number of the tuner units provided is not necessarily one, and there is included a case of providing two or three and more terrestrial tuner units or BS/CS tuner units so as to function in parallel in response to a reserved image recording request.

In addition, the communication unit 11 described previously may be an IEEE1394 interface and can receive digital contents from an external device over a network. In addition, this communication unit can receive a luminance signal or a color difference signal, a video image signal such as a composite signal, or an audio signal from an input terminal (not shown). These signals are selectively supplied to the encoder unit 21 while inputs thereof are controlled by the selector 16 controlled under the control unit 30 or the like.

The encoder unit 21 has video and audio analog/digital converters that digitize an analog video signal or an analog audio signal inputted by the selector 16; a video encoder; and an audio encoder. Further, this encoder unit includes a subsidiary video image encoder. An output of the encoder unit 21 is converted into a compression format such as a predetermined MPEG, and then, is supplied to the control unit 30 described previously.

In addition, the BS/CS digital tuner 12 or the like is not always incorporated. It is preferable that this digital tuner should be externally provided via a data input terminal and supply a received digital signal to the encoder unit 21 or the control unit 30 via the selector unit 16.

Here, the apparatus of FIG. 1 can supply information (pack such as video, audio, and subsidiary video image data) encoded by the encoder unit 21 and management information produced thereby to the hard disk drive unit 18 or the optical disk drive unit 19 via the control unit 30 and record the thus supplied items of information in the hard disk drive unit 18 or an optical disk D. In addition, this apparatus can record the information recorded in the hard disk drive unit 18 or the optical disk D in the optical disk D or the hard disk drive 18, respectively, via the control unit 30 or the optical disk drive unit 19 in an exchangeable manner.

The signal editing unit 20 can carry out an editing process such as partially deleting video objects of a plurality of programs recorded in the hard disk drive unit 18 or the optical disk D or connecting objects of different programs to each other.

Reproducing Process or the Like

Now, a process for reproducing recorded information will mainly be described in detail including those according to other embodiments.

The MPEG decoder unit 23 comprises a video processor that properly combines a decoded subsidiary video image with a decoded main video image and that superimposes and outputs a menu, a highlight button, subtitles or any other subsidiary video image on the main video image.

An output audio signal of the MPEG decoder unit 23 is supplied to a speaker after being analog-converted by a digital/analog converter (not shown), via the selector unit 17 or is supplied to an external device via an interface (I/F) unit 27. The selector unit 17 is controlled by means of a select signal from the control unit 30. In this manner, the selector unit 17 can directly select a signal having passed through the encoder unit 21 when a digital signal from each of the tuner units 12 and 13 is directly monitored.

Reserved Image Recording Process

In addition, the communication unit 11 enables a program table based on electronic program information acquired from the tuner units 12 and 13 to be displayed on a screen in response to a program specified in accordance with an operation of a user's remote controller R or the like by using the program table generating unit 43. In addition, based on reserved image recording information and due to the working of the control unit 30 and the program table generating unit 43, when a reservation time has come, a video image/audio signal obtained by demodulating the program information received by the BS/CS digital tuner unit 12 or the terrestrial digital/analog tuner unit 13 is recorded (reserved/image-recorded) in the hard disk drive unit 18, for example, through an encoding process of the encoder 21 or the like.

The broadcast receiving apparatus 10 according to the present embodiment thus has a comprehensive function, and carries out a recording/reproducing process using an optical disk D or the hard disk drive unit 18 with respect to a plurality of sources.

<Lock Setting Function at the Time of Image Recording Reservation According to an Embodiment of the Present Invention>

Now, with reference to flow charts of FIGS. 4 and 5, a description will be given below in detail with respect to a lock setting function at the time of image recording reservation according to an embodiment of the present invention.

Lock Function Setting Process

With reference to the flow chart of FIGS. 4 and 5, a description will be given in detail with respect to a process for providing lock setting on a program by program basis at the time of an image recording reservation process according to an embodiment of the present invention. The lock setting for each program at the time of the image recording reservation process according to an embodiment of the present invention can be recognized by a lock setting mark K in an image recording list as shown in FIG. 2, the list being generated by a reservation setting unit 42. Then, this lock setting for each program at the time of the image recording reservation process is enabled by an operation of a lock setting icon K2 displayed on an image recording setting screen E shown in FIG. 3.

However, the lock setting function at the time of the reservation process according to the embodiment of the present invention is intended to provide proper lock setting by referring to the past reservation information and by utilizing the working of the lock setting unit 42.

To be more specific, the recording reservation for a specified program is performed based on the working of the reservation setting unit 42, in accordance with a user's operation of a remote controller or the like (step S11). Based on the working of the reservation setting unit 42, a program title and other information on the recording reservation made this time are searched for from the present reservation information, from the present and past reservation information, or from the management information (metadata: a program name, a day of the week for which the reservation is scheduled, a time, a channel, etc.) on the content information recorded in a hard disk driver, a medium 18 and an optical disk D, in order to determine whether the same program title or a similar program title is included (step S12).

When the present program title and other related information are searched for in the present reservation information or in the present and past reservation information, a check is made to see whether the lock setting was made for the previous reservation information. If the lock setting was made for the previous reservation information, lock setting is made for the present reservation information as well. If the lock setting was not, the lock setting is not made for the present reservation information (step S13). In this manner, whether or not to protect contents is determined by automatically referring to the present reservation information, the present and past reservation information, or the management information (metadata: a program name, a day of the week for which the reservation is scheduled, a time, a channel, etc.) on the content information recorded in the hard disk driver, the medium 18 and the optical disk D, without reference to the user's judgments. Hence, proper setting can be easily performed for the contents protection.

If it is determined in step S12 that the same or a similar recording reservation is not included in the present reservation information or in the present and past reservation information, a determination is made as to whether or not to perform lock setting based on a default value (step S14). That is, if the default value is so determined as not to perform lock setting in principle, the lock setting is not performed. Conversely, if the default value is so determined to perform the lock setting in principle, the lock setting is performed. Needless to say, the default value can be changed manually.

As shown in FIG. 5, a resetting screen for recording reservation (FIG. 3) may be preferably displayed for prompting the user to confirm the reserved contents and edit the reservation information, if necessary (step S15). However, the resetting screen for recording reservation does not have to be displayed, in which case the control automatically advances to step S16, as shown in FIG. 4.

When a reservation time has come (step S16) after the above-mentioned recording reservation process, reserved image recording is carried out using the BS/CS tuner unit 12 by the working of the reserved image recording unit 42 (step S17), as shown in FIG. 4. As a result, a video image/audio signal according to a program indicated in reservation information is processed to be encoded by means of the encoder 21 or the like, and then, the encoded signal is recorded as an image in a storage region of the hard disk drive unit 18 or the like.

Next, if the lock setting described previously has been provided to reservation information (step S18), this video image/audio file is handled as a video image/audio file to be protected, and then, lock setting is provided without requiring a user's operation in particular, by the working of the lock control unit 42 or the like (step S19). If the lock setting has not been provided to the reservation information, the video image/audio file is not handled as such, and the lock setting is not performed for the recorded file at the end of the recording (step S20).

Deleting Process

Now, with reference to the flow chart of FIG. 6, a description will be given with respect to a process for deleting a video image file of little importance in the case where a storage free space of the hard disk drive unit 18 or the like becomes insufficient due to image recording.

The deleting process is not indispensable to the present invention. The process may be used, but the present invention can be reduced to practice without the process.

Figure 6:
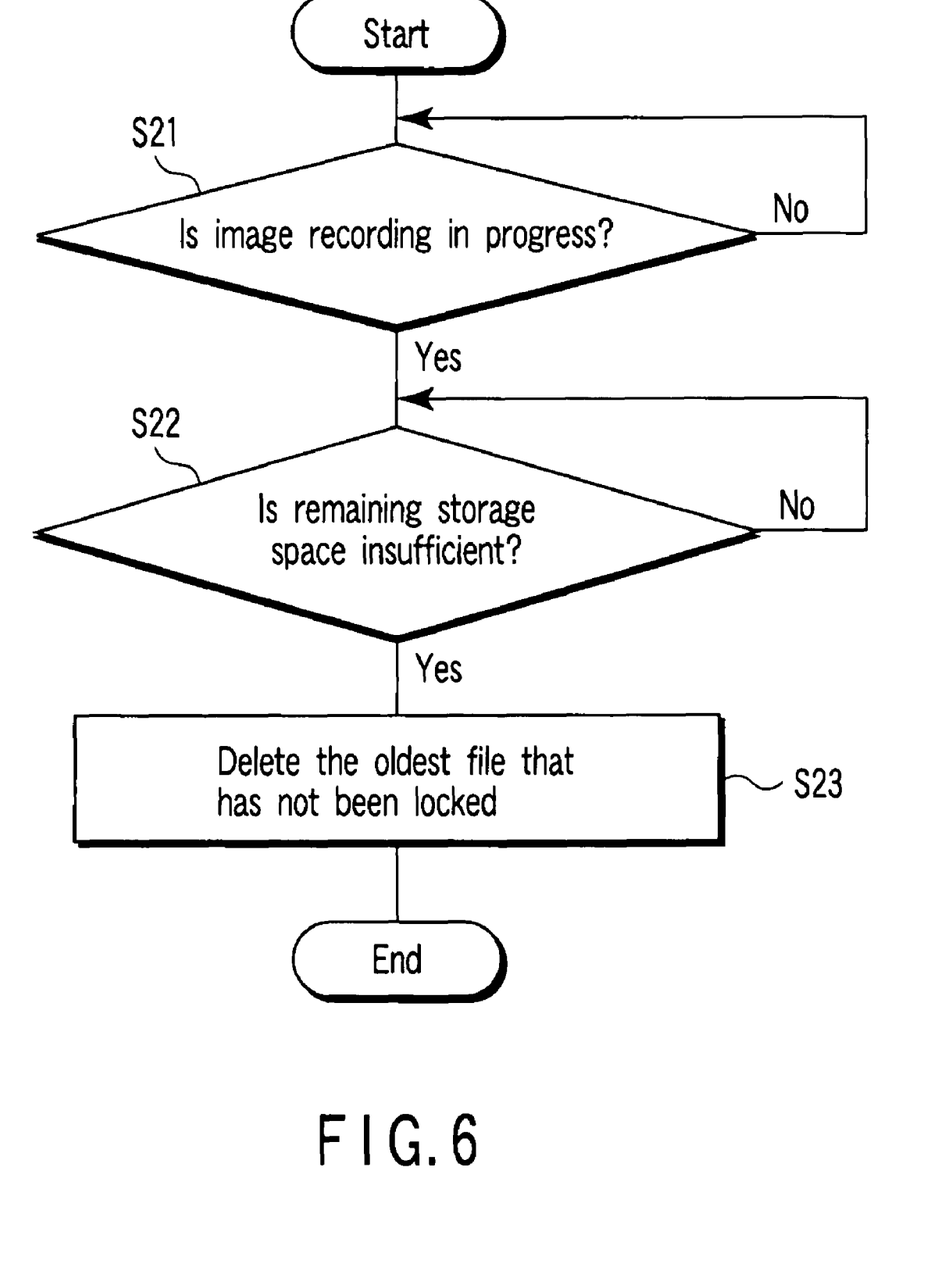
FIG. 6 is a flow chart showing an operation of a file deleting process using the broadcast recording apparatus.

Referring to the flowchart shown in FIG. 6, when a general image recording process is carried out by a reserved image recording process using the reserved image recording unit 42 or by the operation of a remote controller R (step S21), a storage free space of the hard disk drive unit 18 or the like is reduced. If a judgment that a remaining space is too small to continue image recording is made by the reserved image recording unit 42, the control unit 30 and the like (step S22), it is judged whether or not a video image audio file is subjected to the lock setting provided in FIG. 3 under the control of the reserved image recording unit 42, the control unit 30 or the like. Then, the oldest file, for example, is deleted from among the video image files in which no lock setting is provided (step S23). In this manner, a margin is provided to the storage space of the hard disk drive unit 18, whereby an image recording is enabled to continue. In this manner, a video image file of a program subjected to the lock setting by a user is not deleted even if it is an old file and the storage free space of the hard disk is insufficient.

Therefore, if a user thinks that a certain video file is an important program that must be stored at the time of image recording reservation process, the user provides the lock setting at the time of the image recording reservation process, thereby making it possible to reliably protect and store the video image file of that program without subsequently requiring any user's operation in particular.

The user can arbitrarily provide setting as to what kind of video image file is to be deleted, making it possible to arbitrarily select what kind of video image file should be deleted.

(Application to Broadcast Receiving Apparatus)

The processes described in the flow charts of FIGS. 4, 5 and 6 can be applied not only to the broadcast receiving apparatus 10 described above, but also similarly to a hard disk recorder or the like that is a broadcast receiving apparatus 10 having an image recording function, for example.

One skilled in the art can achieve the present embodiment in accordance with a variety of embodiments described above. Further, a variety of modified examples of these embodiments can also be easily conceived by one skilled in the art and can be applied to a variety of embodiments even if one does not have any inventive ability. Therefore, the present invention covers a broad range without departing from a disclosed principle and novel features and is not limited to the embodiments described above.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast recording apparatus, comprising:
   a tuner unit which receives a broadcast signal, demodulates the received signal, and outputs a video image/audio signal;
   a reservation setting unit which sets a first recording reservation information including a recording reservation title and instructing recording of a first image/audio signal corresponding to a first program having the recording reservation title in a first recording reservation time; and
   a lock setting unit which adds a lock setting to the first recording reservation information to refuse automatic deletion of the first image/audio signal corresponding to a first program if a second recording reservation information set prior to the first recording reservation information includes a similar title to the recording reservation title, and the second recording reservation information which instructs recording of a second image/audio signal corresponding to a second program having the similar title in a second recording reservation time includes the lock setting to refuse automatic deletion of the second image/audio signal corresponding to the recorded second program.

2. The broadcast recording apparatus according to claim 1, further comprising:
   a reservation editing unit which displays a screen for re-editing with respect to the first recording reservation information and the lock setting added to the first recording reservation information; and
   a reserved image recording unit which records the first video image/audio signal of the first program in a storage area together with the lock setting in accordance with the first reservation information and the lock setting edited by the reservation editing unit in the first recording reservation time.

3. The broadcast recording apparatus according to claim 2, wherein:
   if the storage area is insufficient in storage capacity when the reserved image recording unit performs reservation recording in accordance with the first recording reservation information, the lock setting unit deletes a plurality of video image/voice-audio signals which are stored in the storage area and for which the lock setting is not designated.

4. The broadcast recording apparatus according to claim 3, wherein the lock setting unit deletes an oldest one of video image/wise audio signals for which the lock setting is not designated.

5. The broadcast recording apparatus according to claim 1, further comprising:
   a generation unit which generates a video image/voice signal in order to display an icon representing designation of the lock setting for each of programs in an image recording list which the reservation setting unit uses for reservation.

6. The broadcast recording apparatus according to claim 1, further comprising:
   a generation unit which generates a video image/voice signal in order to display an icon for designation of the lock setting, when the reservation setting unit is performing image recording setting, for reservation.

7. A broadcast recording method comprising:
   receiving and demodulating a broadcast signal and outputting a video image/audio signal;
   setting a first recording reservation information including a recording reservation title and instructing recording of a first image/audio signal corresponding to a first program having the recording reservation title in a first recording reservation time;
   adding a lock setting to the first recording reservation information to refuse automatic deletion of the first image/audio signal corresponding to a first program if a second recording reservation information set prior to the first recording reservation information includes a similar title to the recording reservation title, and the second recording reservation information which instructs recording of a second image/audio signal corresponding to a second program having the similar title in a second recording reservation time includes the lock setting to refuse automatic deletion of the second image/audio signal corresponding to the recorded second program; and
   recording the first image/audio signal of the first program in a storage area together with the lock setting, in the first recording reservation time of the first recording reservation information.

* * * * *

UNITED STATES PATENT AND TRADEMARK OFFICE
CERTIFICATE OF CORRECTION

| | |
|---|---|
| PATENT NO. | : 8,406,612 B2 |
| APPLICATION NO. | : 11/707007 |
| DATED | : March 26, 2013 |
| INVENTOR(S) | : Kimura |

It is certified that error appears in the above-identified patent and that said Letters Patent is hereby corrected as shown below:

In the Claims:

Claim 3, column 8, line 17, change "video image/voice-audio signals" to --video image/audio signals--.

Signed and Sealed this
Eighteenth Day of June, 2013

Teresa Stanek Rea
*Acting Director of the United States Patent and Trademark Office*